(12) United States Patent
Kuwabara et al.

(10) Patent No.: US 8,301,185 B2
(45) Date of Patent: Oct. 30, 2012

(54) COORDINATION METHOD AND COMMUNICATION TERMINAL

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 733 days.

(21) Appl. No.: 11/889,979

(22) Filed: Aug. 17, 2007

(65) Prior Publication Data

US 2008/0045276 A1 Feb. 21, 2008

Related U.S. Application Data

(63) Continuation of application No. PCT/JP2006/303055, filed on Feb. 21, 2006.

(30) Foreign Application Priority Data

Feb. 21, 2005 (JP) .................................. 2005-044393

(51) Int. Cl.
*H04M 1/00* (2006.01)
(52) U.S. Cl. ..................... 455/550.1; 455/572; 455/573; 455/574; 455/423; 455/424; 719/318; 719/328
(58) Field of Classification Search .................. 455/418, 455/550.1, 567, 571–574, 127.1, 127.5, 343.5, 455/405, 412.2, 423–425; 719/318, 328
See application file for complete search history.

(56) References Cited

U.S. PATENT DOCUMENTS

| | | | |
|---|---|---|---|
| 5,471,621 A | 11/1995 | Ohtsuki | |
| 7,706,772 B2 * | 4/2010 | Malcolm | ..................... 455/343.4 |
| 2004/0214616 A1 | 10/2004 | Malcolm | |
| 2005/0250531 A1 * | 11/2005 | Takebe et al. | .............. 455/550.1 |

FOREIGN PATENT DOCUMENTS

| | | |
|---|---|---|
| EP | 1507202 | 2/2005 |
| JP | 4-333119 | 11/1992 |
| JP | 2003-101466 | 4/2003 |
| JP | 2003-125076 | 4/2003 |
| JP | 2004-46300 | 2/2004 |

OTHER PUBLICATIONS

Supplementary European Search Report issued for corresponding European Patent Application No. 06714195.2 dated Dec. 19, 2011.
International Search Report issued for counterpart International Application No. PCT/JP2006/303055 dated May 2, 2006.
Korean Notice of Submission of Opinion issued for counterpart Korean Patent Application No. 10-2007-7019153 dated May 9, 2012.

* cited by examiner

*Primary Examiner* — Wayne Cai
(74) *Attorney, Agent, or Firm* — Kratz, Quintos & Hanson, LLP

(57) ABSTRACT

Whenever, there occurs a predetermined event which occurs periodically, a host section which includes a host processor 31, makes a judgment of whether or not it is an engine-mode state in which an engine section 40 is executing an engine application, and whether or not it is estimated that the engine-mode state will be continued. When this judgment result is affirmative, the host section notifies to the engine section 40, information which the host section has collected after the previous notification, and which is to be notified periodically to the engine section. As a result of this, at a periodic timing called as an occurrence of a predetermined event, periodic notification data is notified from the host section to the engine section 40. Therefore, in a configuration which includes a host section including a host processor, and an engine section including an engine processor, which executes a predetermined function under a control of the host section, an increase in a load on the engine section 40 is suppressed.

15 Claims, 10 Drawing Sheets

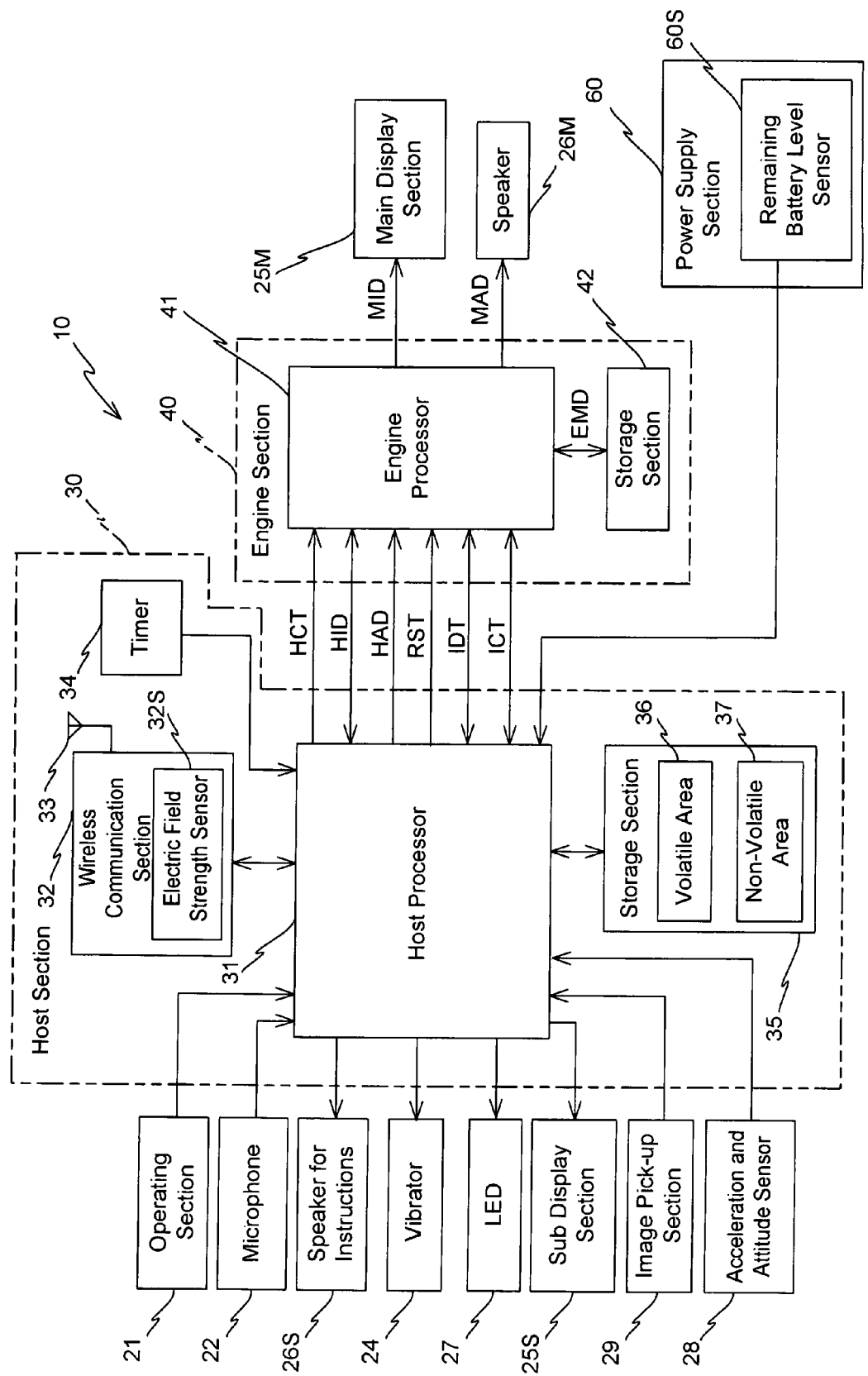

COORDINATION METHOD AND COMMUNICATION TERMINAL

RELATED APPLICATION

This is a continuation application of the international patent application No. PCT/JP2006/303055 filed with Application date: Feb. 21, 2006. The present application is based on, and claims priority from, J.P. Application 2005-044393, filed on Feb. 21, 2005, the disclosure of which is hereby incorporated by reference herein its entirety.

BACKGROUND OF THE INVENTION

The present invention relates to a coordination method and a communication terminal, and more particularly to a coordination method which is a method of operating by coordination between a host section which performs a processing associated with a communication with an outside, and an engine section which executes a predetermined function under a management of the host section, and a communication terminal which uses the coordination method.

BACKGROUND ART

Mobile communication terminals such as cellular phones have hitherto been used widely as a communication terminal. There has been a remarkable development in a technology related to the mobile communication terminals, particularly the cellular phone. In addition to a communication function via a mobile communication network which is an essential function as the mobile communication terminal, optional functions for enjoying games and music have also been installed.

In such mobile communication terminals, there is a built-in processor which performs various data-processing for carrying out the essential functions and the optional functions. Resources such as a storage section, which include a storage element for storing various computer programs and data, a wireless communication section for performing wireless communication, an operating section for a user to input operation commands, and a notifying section (display section and an audio output section) for notifying various information to the user, are connected to this processor. Moreover, by executing the computer programs stored in the storage section, and controlling appropriately the resources connected according to the requirement, by the processor, the essential functions and the optional functions are carried out.

SUMMARY OF THE INVENTION

As it has been mentioned above, since it is necessary to carry out various functions in the conventional mobile communication terminal, a general purpose processor is adopted as the built-in processor. This is an excellent method from a point of view of letting the communication terminal to have a simple configuration, and reducing a size and letting low power consumption of the mobile communication terminal. However, when the general purpose processor is used, even when an attempt is made to improve a performance in the operation of optional functions for enjoying games and music for example, it has been difficult to facilitate a significant improvement in the performance.

Incidentally, when a comparison is made with the other information processing apparatuses, it can be said that the improvement of performance in the mobile communication terminal is sought for the operation of optional functions. The concrete example of optional functions which are sought to be improved is execution of a game and playing music etc. However, in a case of operation of the operation of such optional function, particularly, a screen display processing and an audio data output processing can be said to be exerting a substantial load on the processor.

Moreover, the mobile communication terminal is expected to carry out the essential functions and the optional functions mentioned above, but as a general rule since there is one user, it has not yet been expected that the essential functions and the optional functions are simultaneously operated independently in any case. For example, when the operation of conversation which is an operation of the essential function is performed, it has not been expected that a game operation which is an optional function is also performed.

For the reasons mentioned above, introducing an engine processor exclusively for optional functions, superior in the screen display processing and the audio data output processing, and making an engine section which includes the engine processor, execute an application corresponding to the operation of the optional functions, under the control of a host section which includes a host processor which is a processor performing the communication operation, can be taken into consideration. When a configuration including such host section and engine section is adopted, a device is connected to the host processor of the host section, as well as a device is connected to the engine processor of the engine section.

At this time, a configuration in which all the devices to be used in association with the operation of the essential functions such as the communication operation are connected to the host processor, and all the devices to be used in association with the operation of the optional functions such as an application operation are connected to the engine processor, can also be taken into consideration. However, when the devices used in association with the operation of the essential functions and the devices used in association with the operation of optional functions are compared, many devices are devices which have common functions.

For example, a key input device which is essential for realizing the communication function which is a basic function of the communication terminal, is a device which is necessary for f executing an application such as the game application which is an optional function. Moreover, when the communication terminal is a portable mobile communication terminal, the display is essential during an operation of a basic function, and there is a sensor device which detects a state to be reflected in the display during the operation of an optional function. An electric field strength sensor device for detecting an electric field strength of radio waves from a base station of a mobile communication network, and a remaining battery level sensor device are available as such sensor device.

Arranging various devices which generate such information data (hereinafter called as 'input-data generating devices') for the host processor as well as the engine processor brings that a large number of devices each having a large number of same functions will be arranged in duplicate, and it would not be possible to let the communication terminal have a simple and compact configuration. Therefore, it is considerable to employ a configuration in which the input-data generating device as described above is connected only to the host processor, and the information data from the input-data generating device is sent according to the requirement, from the host section which includes the host processor, to the engine section which includes the engine processor.

Incidentally, in a case of sending the information data from the host section to the engine section, generally, an interrupt response processing occurs in the engine section. In other words, an interrupt processing request is made for carrying out a data reception processing, from the host section to the engine section, in one-data unit when there is no interface buffer memory, and in one data block unit when the interface buffer memory has been arranged. Moreover, the engine section responds to the interrupt processing request and performs the data reception processing.

Since the interrupt request occurs asynchronously with the processing of the engine section, it is heavy load for the engine section to carry out the data reception process in response to the interrupt request during the execution of the application. Still more, when a frequency of occurrence of the interrupt request becomes high, a substantial load is exerted on the engine section.

The present invention is made in view of the abovementioned circumstances, and it is an object of the present invention to provide a coordination method which enables to suppress an increase in a load on the engine processor, while building compactly the overall communication terminal having a configuration which includes a host section which includes a host processor and carries out processing associated with communication with an outside, and an engine section which executes a predetermined function under the control of the host section.

Moreover, it is an object of the present invention to provide a communication terminal having a configuration which includes the host section which carries out processing associated with communication with the outside, and the engine section which carries out the predetermined function under the control of the host section, which enables to build compactly the overall communication terminal, and to suppress an increase in load on the engine section.

Inventors of the present invention, as a result of the research, made a finding that there exists a plurality of types of input-data generating devices as described above for which a frequency of generating data cannot be said to be high, and information data which is generated is not required to be transmitted instantaneously to the engine section with top priority. For example, in the communication terminal, a key input device generates information data at a frequency in accordance with a key-input speed of a user. Moreover, although sensors such as an electric field strength sensor and a remaining battery level sensor in sensor devices mounted in the mobile communication terminal carry out a detection operation constantly when a power supply of the mobile communication terminal is ON, it is not necessarily required to notify a detection result to the user at a frequency according to a detection speed of the sensor, and the detection result of the sensor may be notified to the user at a frequency with which the user doesn't feel the inconvenience. The present invention is made based on this finding.

A coordination method of the present invention is a coordination method for operating by coordination between a host section which performs a processing associated with a communication with an outside, and an engine section which executes an application under a control of the host section, in a communication terminal, comprising steps of: judging an operation mode at which, whenever there occurs a predetermined event which occurs periodically, the host section makes a judgment of whether or not it is an engine-mode state in which the engine section is executing the application, and, it is estimated that the engine-mode state will continue; and notifying specific information at which, when a judgment result at the step of judging the operation mode is affirmative, the host section notifies to the engine section, specific information which is to be notified periodically to the engine section, including at least one operation-environment information of the communication terminal which the host section has collected newly after a previous notification.

In this coordination method, at the step of judging the operation mode, whenever there occurs a predetermined event which occurs periodically, the host section makes a judgment of whether or not it is the engine-mode state in which the engine section is executing the application, and it is estimated that the engine-mode state will continue. Here, a judgment of whether or not it is estimated that the engine-mode state will continue is made by making a judgment of whether or not the host section is not making an attempt to stop or temporarily stop the execution of the application in the engine section, when there arises a need to perform a processing with an occurrence of an event such as receiving a call, having a degree of priority higher than the application execution processing.

When the judgment at the step of judging the operation mode is affirmative, at the step of notifying specific information, the host section notifies the specific information to the engine section. The specific information is collected by the host section after the previous notification, and is to be notified periodically to the engine section. Therefore, at the time of notification of the specific information from the host section to the engine section, at a periodic timing of occurrence of the predetermined event, the specific information which normally includes a plurality of various information, is notified from the host section to the engine section.

As a result of this, a data reception processing in the engine section associated with the notification of the specific information from the host section to the engine section is performed only at each occurrence of the predetermined event, and the engine section does not have to perform the data reception processing for each type of information included in the specific information. Consequently, according to the coordination method of the present invention, in a configuration comprising the host section which performs the processing associated with the communication with the outside, and the engine section which executes a predetermined function under the control of the host section, it is possible to suppress an increase in a load on the engine processor while building compactly the entire communication terminal.

In the coordination method of the present invention, the predetermined event can be let to include an elapsing of a fixed period of time from an end of the previous step of notifying specific information. In this case, when it is estimated that it is the engine-mode state, and that the engine-mode state will continue, the specific information is notified from the host section to the engine section periodically, at a cycle of the fixed time.

Moreover, in the coordination method of the present invention, the operation-environment information may be let to include state information of a power supply section of the communication terminal and time information. In this case, the engine section is capable of informing the user, remaining battery level information and the time information during the execution of the application by displaying etc. on a display section.0

Furthermore, in the coordination method of the present invention, the specific information can be let to include key input data other than key input data which is processed only by the host section, out of key input data which is input by the user, after the end of the previous step of notifying the specific information. In this case, the engine section can use the key input data at the time of execution of the application.

In the coordination method of the present invention, the specific information can be let to include a detection result by a sensor used in the application, after the end of the previous step of notifying the specific information. In this case, the engine section can use the detection result by the sensor at the time of execution of the application.

Moreover, in the coordination method of the present invention, the communication terminal can be let to be a mobile communication terminal such as a cellular phone. Here, the operation-environment information can be let to include electric field strength information of radio waves from a base station of a mobile communication network which is in vicinity of the communication terminal. In this case, the engine section can inform the user the electric field strength information of radio waves from the base station, during the execution of the application, by displaying etc. on the display section.

A communication terminal of the present invention is a communication terminal comprising: a host section which includes a host processor, and performs a processing associated with a communication with an outside; an engine section which includes an engine processor, and executes an application under a control of the host section; and a power supply section which supplies an operating electric power to the host section and the engine section, and whenever there occurs a predetermined event which occurs periodically, the host section makes a judgment of whether or not it is an engine-mode state in which the engine section is executing the application, and it is estimated that the engine-mode state will continue, and when a judgment result is affirmative, the host section notifies to the engine section, specific information which is to be notified periodically to the engine section, including at least one operation-environment information which the host section has collected after a previous notification.

In this communication terminal, whenever there occurs a predetermined event which occurs periodically, the host section makes a judgment of whether or not it is the engine-mode state in which the engine section executes the application, and it is estimated that the engine-mode state will continue. When a result of this judgment is affirmative, the host section notifies to the engine section the specific information which the host section has collected after the previous notification, and which is to be notified periodically to the engine section.

In the communication terminal of the present invention, it is possible to use the coordination method of the present invention which has been described above. Consequently, according to the communication terminal of the present invention, it is possible to build compactly the entire communication terminal while adopting a configuration which includes the host section which performs processing associated with the communication with the outside, and the engine section which executes a predetermined function under the control of the host section, and to suppress an increase in load on the engine section.

In the communication terminal of the present invention, a configuration can be let to be such that the power supply comprises a power-supply state monitoring section which monitors a state of a power-supply capacity, and notifies monitoring result to the host section, and the operation-environment information includes information of state of the power supply capacity of the power supply section. In this case, the engine section can inform the user the remaining battery level information during the execution of application, by displaying etc. on the display section.

Moreover, in the communication terminal of the present invention, the host section can be let to further comprise a clock unit which is connected to the host processor, and the predetermined event can be let to be an elapsing of a fixed period of time, from the previous notification of the specific information. In this case, when it is estimated that it is the engine-mode state, and that the engine-mode state will continue, the specific information is notified periodically by the host section to the engine section, at a cycle of a fixed time.

Here, the operation-environment information can be let to include information of present time. In this case, the engine section can inform the user the present time during the execution of the application, by displaying etc. on the display section.

Moreover, in the communication terminal of the present invention, the host section may be let to further include a key input unit which is connected to the host processor, and the specific information may be let to comprise key input data other than key input data which is processed only by the host section, out of key input data which is input by the user. The engine section can use the key input data at the time of execution of the application.

Furthermore, in the communication terminal of the present invention, the host section may be let to further comprise a sensor means which is connected to the host processor, and obtained a detection result used in the application, and the specific information may be let to include a detection result by the sensor after the end of the previous notification of the specific information. In this case, the engine section can use the detection result by the sensor at the time execution of the application.

In the communication terminal of the present invention, the host section may be let to further comprise a wireless communication section which is connected to the host processor, and is for carrying out a wireless communication with a base station of a mobile communication network. In this case, it is possible to let the communication terminal of the present invention to be a mobile communication terminal such as a cellular phone.

Here, the wireless communication section may be let to comprise an electric field strength monitoring section for monitoring an electric field strength of radio waves from the base station, and the operation-environment information may be let to comprise electric field strength information of radio waves from the base station in the wireless communication section. In this case, the engine section can inform the user the electric field strength information of the radio waves from the base station during the execution of the application, by displaying etc. on the display section.

As it has been described above, according to a coordination method of the present invention, there is shown an effect that it is possible to suppress an increase in load on an engine processor, while building compactly the entire communication terminal, in a configuration which includes a host section which has a host processor, and which performs a processing associated with a communication with an outside, and an engine section which has an engine processor, and which executes a predetermined function under a control of the host section.

Moreover, according to a mobile communication terminal of the present invention, there is shown an effect that it is possible to build compactly the entire communication terminal while adopting a configuration which includes the host section which performs a processing associated with the communication with the outside, and the engine section which executes a predetermined function under the control of the host section, and to suppress an increase in load on the engine section.

BRIEF DESCRIPTION OF DRAWINGS

FIG. 2 is a block diagram for showing a functional configuration of the cellular phone in FIG. 1;

DETAILED DESCRIPTION

Figure 1C:
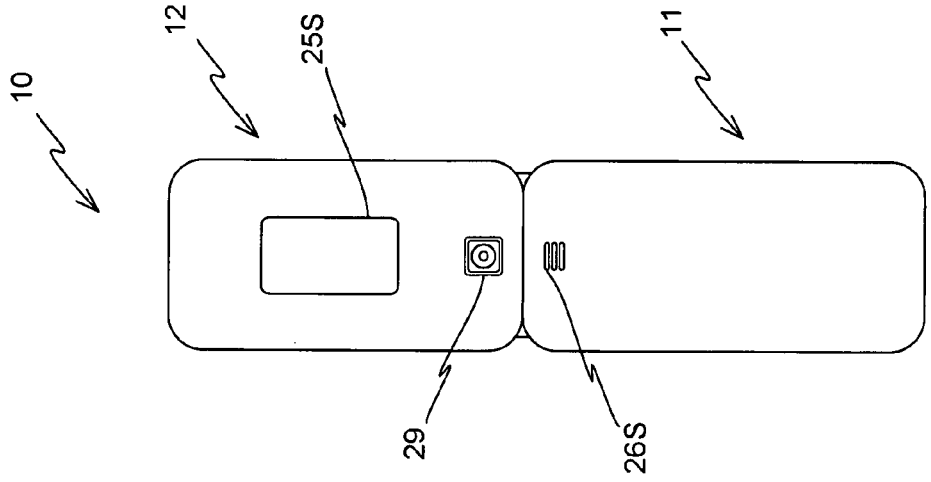
FIG. 1C is a diagram showing schematically a rear-side external view of the cellular phone according to the embodiment of the present invention.
Figure 1B:
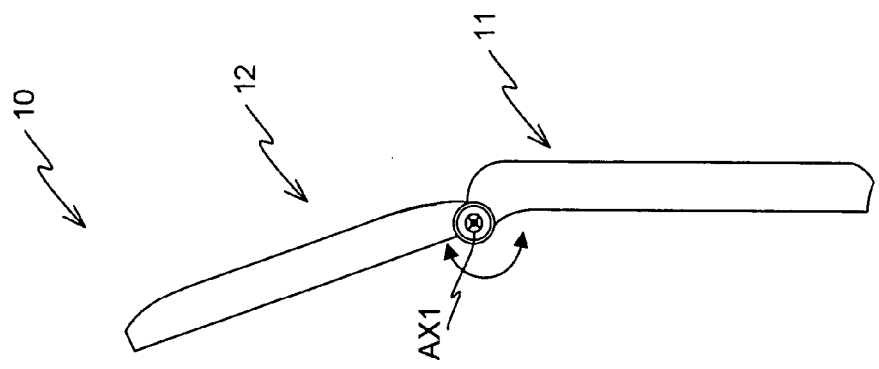
FIG. 1B is a diagram showing schematically a side external view of the cellular phone according to the embodiment of the present invention.

An embodiment of the present invention will be described below while referring to FIG. 1A to FIG. 9. In the diagrams, same reference numerals are assigned to similar or same components, and the repeated description is omitted.

In FIG. 1A, FIG. 1B, FIG. 1C and FIG. 2, a configuration of a cellular phone 10 which is a communication terminal according to the embodiment is shown schematically. Here, in FIG. 1A a front-side external view of the cellular phone 10 in an opened state is shown, in FIG. 1B a side external view of the cellular phone 10 in the opened state is shown, and in FIG. 1C, a rear-side external view of the cellular phone 10 in the opened state is shown. Moreover, in FIG. 2, a functional block configuration of the cellular phone 10 is shown.

As shown in FIG. 1, the cellular phone 10 includes a first portion 11, and a second portion 12 which is rotatable with respect to the first portion 11, with an axis AX1 as a central axis.

Figure 1A:
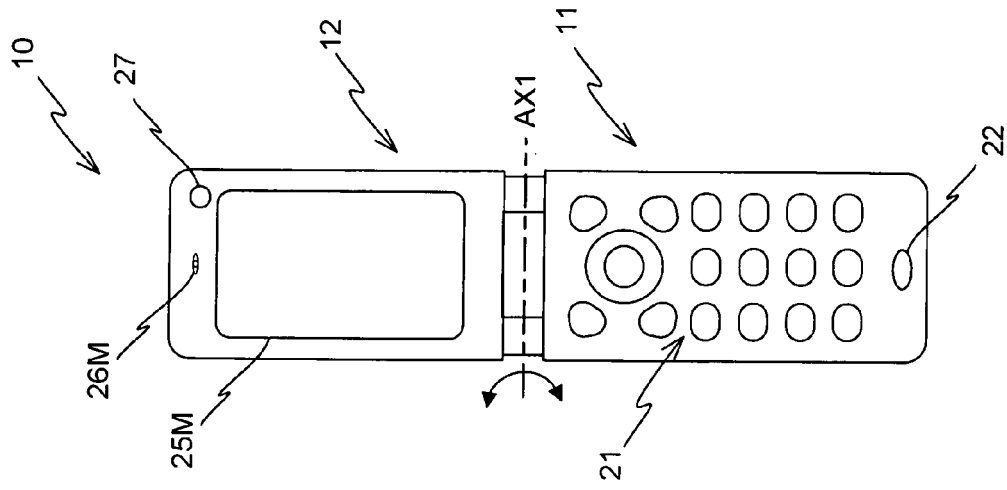
FIG. 1A is a diagram showing schematically a front-side external view of a cellular phone according to an embodiment of the present invention.

In the first portion 11, (a) an operating section 21 in which operation keys such as a numerical keypad and function keys are arranged, and (b) a microphone 22 for inputting voice at the time of conversation are disposed as shown in FIG. 1A. Moreover, when a surface of the operating section 21 in the first section is let to be a front surface, on a rear surface thereof, (c) a speaker for instructions 26S for generating a ring tone and instruction tone is disposed as shown in FIG. 1C. Here, the function keys in the operating section 21 include host-specific keys such as a key for commanding ON/OFF of a power supply by pressing for a long time, a key for a transition to an end of conversation and a standby screen display state in a state of conversation, and a key for commanding a temporary stop of an application when the application is not being executed in an engine section 40 which will be described later (hereinafter called as 'conversation-end key').

In the second section 12, (d) a main display section 25M which displays operation instructions, an operating condition, a message received, an pick-up result by an image pick-up section 29 which will be described later, and an image etc. by an engine application, (e) a speaker 26M which reproduces an audio signal which is transmitted from a communication counterpart at the time of conversation, and (f) an LED (Light Emitting Diode) 27 for evoking attention of a user, are disposed as shown in FIG. 1A. Moreover, when a display surface of the main display section 25M in the second portion 12 is let to be a front surface, on a rear surface thereof, (g) a sub display section 25S which performs an auxiliary display, and (h) the image pick-up section 29 which picks up an image in a field of view of an image-forming optical system, are disposed as shown in FIG. 1C.

Moreover, as shown in FIG. 2, the cellular phone 10 further includes (i) a vibrator 24 for notifying the user an incoming call by vibrating the cellular phone 10 when there is an incoming call, and (j) an acceleration and attitude sensor 28 for detecting an acceleration which acts on the cellular phone 10, and an attitude of the cellular phone 10. The vibrator 24 and the acceleration and attitude sensor 28 are disposed inside the cellular phone 10.

Furthermore, the cellular phone 10 includes (k) a host section 30 for carrying out basic functions as a cellular phone, such as a conversation function, and (l) the engine section 40 which carries out execution of an engine application. The host section 30 and the engine section 40 are disposed inside the cellular phone 10.

Moreover, the cellular phone 10, at an inner side, includes (m) a power supply section 60 which supplies an electric power for operation to each component described above. This power supply section 60 includes a battery as a power supply, and also includes a remaining battery level sensor 60S which detects a remaining battery level. In FIG. 2, a supply route of the electric power for operation, from the power supply section 60 is omitted.

The host section 30 includes a host processor 31 which performs an integrated control of the overall cellular phone 10, a wireless communication section 32 for transmitting and receiving a communication signal via an antenna 33, a timer 34 which performs a clock operation, and notifies whenever a time specified in advance (hereinafter called as 'specified time') to the host processor 31 periodically, has elapsed, and a storage section 35 which stores computer programs and data. Here, the wireless communication section 32 and the storage section 35 are connected to the host processor 31. Moreover, the operating section 21, the microphone 22, the speaker for instructions 26S, the LED 27, the sub display section 25S, and the vibrator 24 described above are also connected to the host processor 31. Furthermore, the remaining battery level sensor 60S described above is also connected to the host processor 31, and the host processor 31 is capable of reading a detection result of the remaining battery level sensor 60S.

A central processing unit (CPU) function and a digital signal processor (DSP) function are mounted in the host processor 31. Moreover, by executing upon reading a computer program for host 38 (refer to FIG. 3) stored in the storage section 35, by the host processor 31, basic function operations such as a communication function operation, and an exchange of various data between the host processor 31 and the engine section 40 are performed.

The wireless communication section 32, in addition to a wireless transmitter and receiver element, includes an electric field strength sensor 32S which detects an electric field strength of radio waves from a base station of a mobile communication network. The host processor 31 is capable of reading a detection result of the electric field strength sensor 32S.

Figure 3:
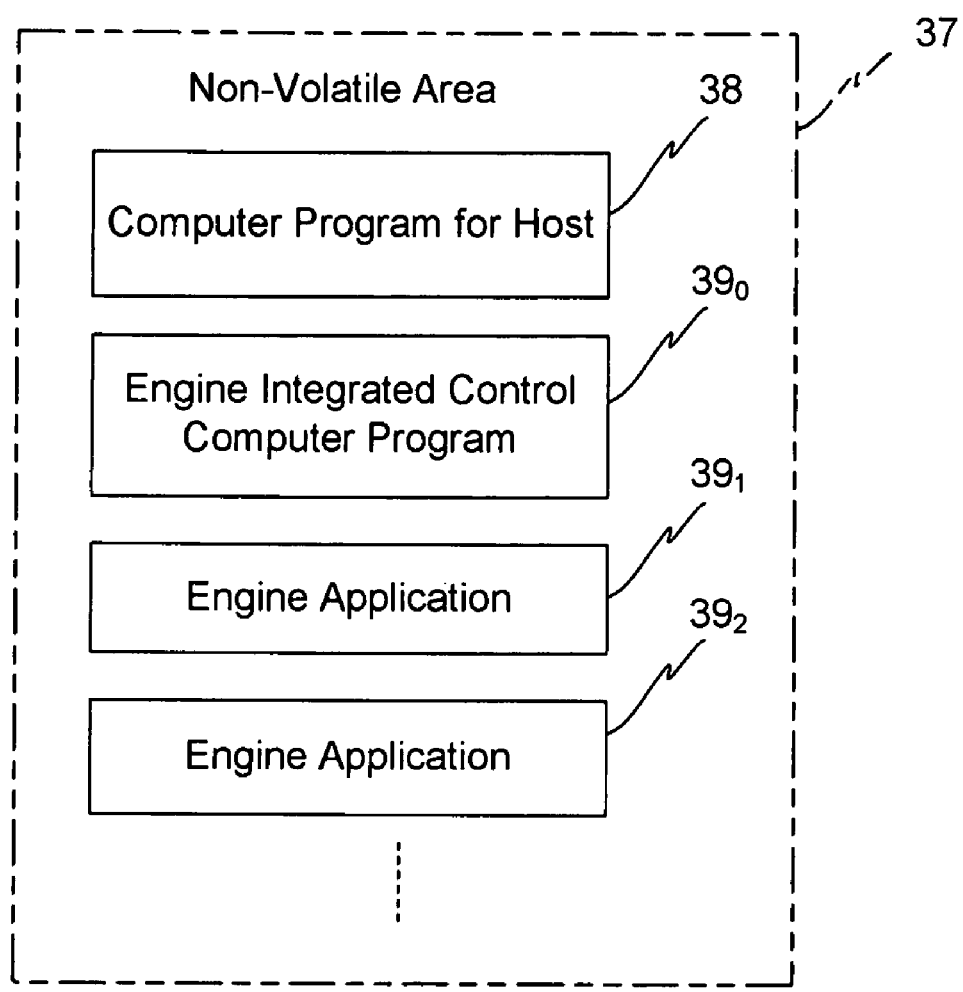
FIG. 3 is a diagram for showing a content of a non-volatile area in a storage section of a host section in FIG. 2.

The storage section 35 includes a volatile area 36 for storing temporarily various data, and a not-volatile area 37 for storing permanently computer programs etc. The volatile area 36 is formed by a volatile storage element of which, storage content is not secured when the electric power for operation is not supplied. Moreover, the non-volatile area 37 is formed by a non-volatile storage element of which, storage content is secured even when the electric power for operation is not supplied. Here, in the non-volatile area 37, an engine integrated control computer program $39_0$, and engine applications $39_1$, $39_2$, . . . are stored in addition to the computer program for host 38 as shown in FIG. 3.

Coming back to FIG. 2, the engine section 40 includes an engine processor 41 which performs an integrated control of the entire engine section 40, and a storage section 42 which stores data and computer programs executed by the engine processor 41. Here, the storage section 42 is connected to the engine processor 41. Moreover, the main display section 25M and the speaker 26M described above are connected to the engine processor 41.

Figure 4:
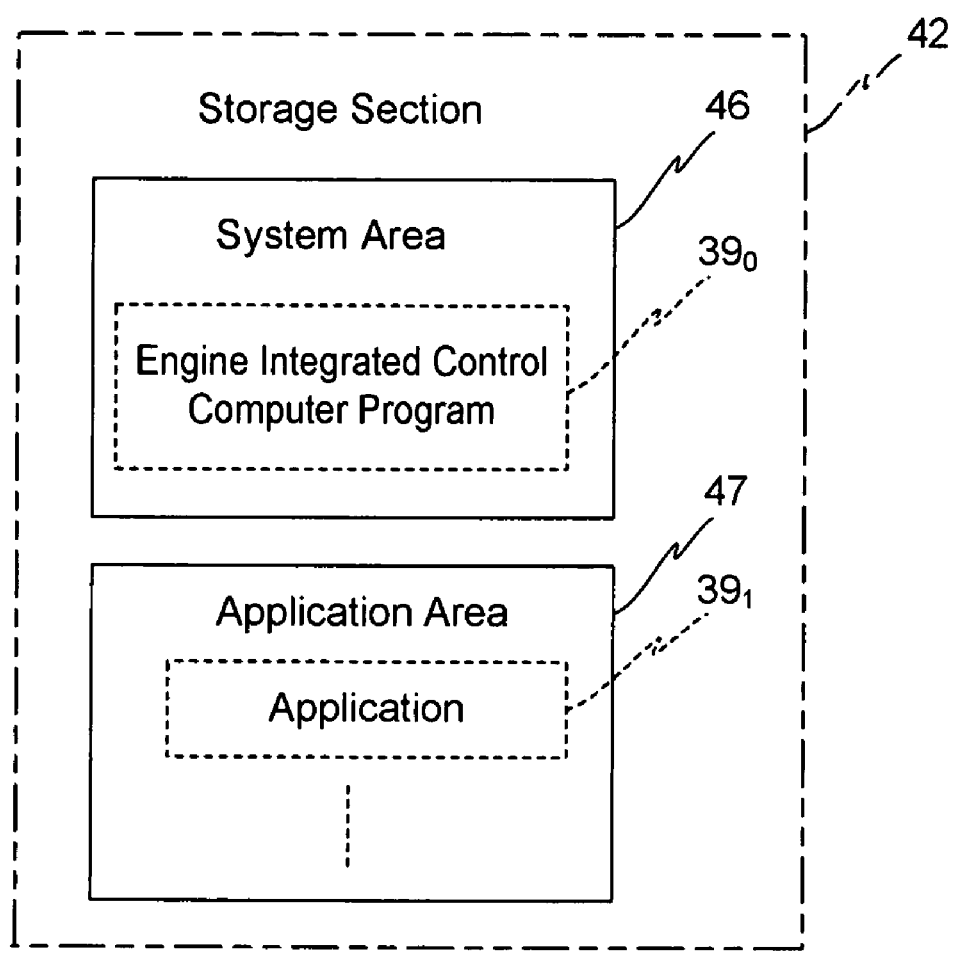
FIG. 4 is a diagram for showing a configuration of a storage section of an engine section in FIG. 2.

The storage section 42 is formed by a volatile storage element of which, storage content is not secured when the electric power for operation is not supplied. Here, the storage section 42, as shown in FIG. 4, includes a system area 46 in which the engine integrated control computer program $39_0$ described above is stored, and an application area 47 in which at least any one or more of the engine application $39_1$, $39_2$, . . . is stored.

Figure 5:
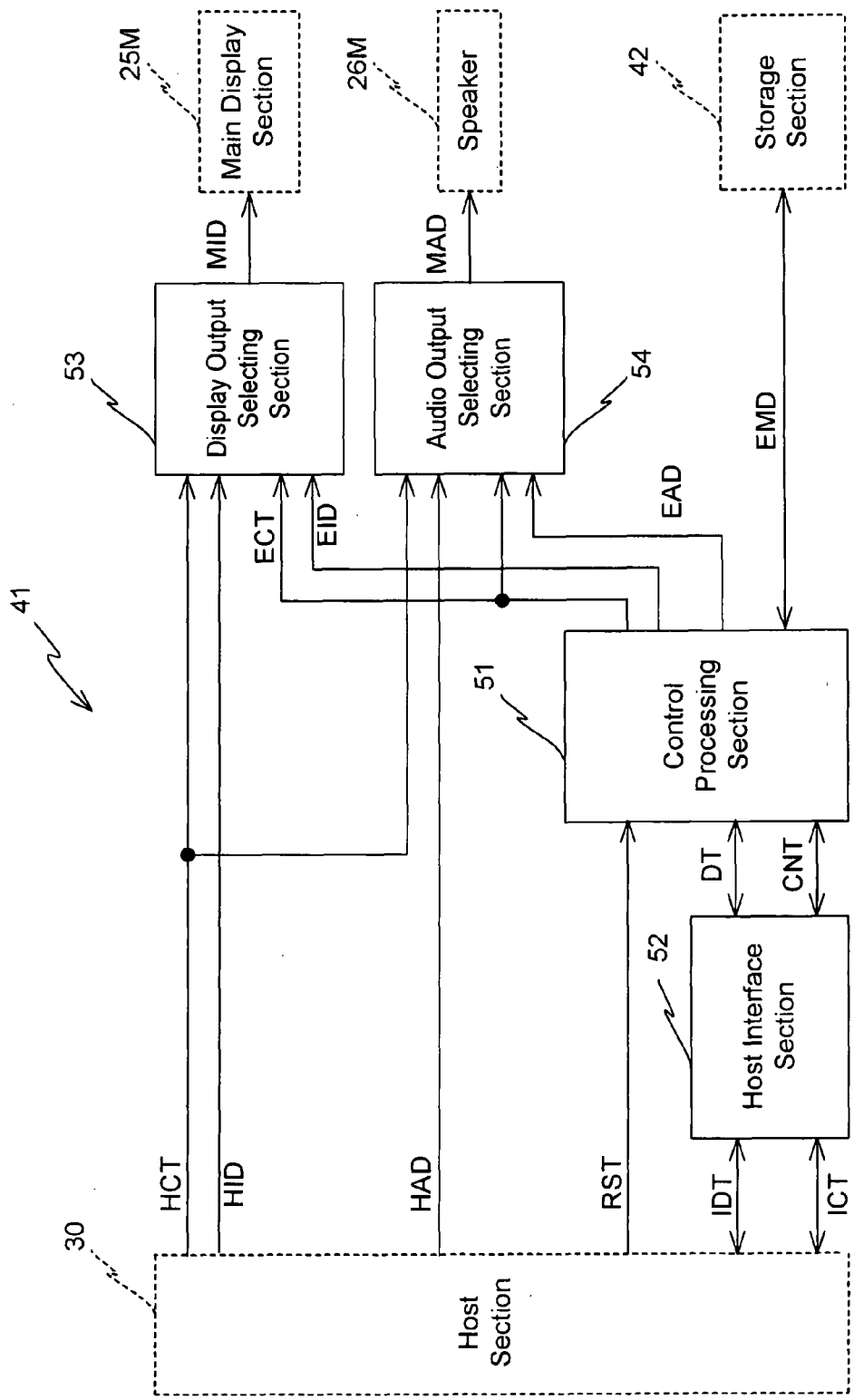
FIG. 5 is a block diagram for showing a configuration of an engine processor in FIG. 2.

The engine processor 41, as shown in FIG. 5, includes a control processing section 51, and a host interface section 52. Moreover, the engine processor 41 includes a display output selecting section 53 for providing to the main display section 25M upon selecting any one of a host display image signal HID from the host section 30, and an engine display image signal EID from the control processing section 51, as a display image signal MID to be supplied to the main display section 25M. Furthermore, the engine processor 41 includes an audio output selecting section 54 for supplying to the speaker 26 upon selecting any one of a host audio signal HAD from the host section, and an engine audio signal EAD from the control processing section 51, as an audio signal MAD to be supplied to the speaker 26M.

The control processing section 51 executes any one of the engine applications $39_1$, $39_2$, . . . under the control of the engine integrated control computer program $39_0$. The control processing section 51 has a three-dimensional graphic processing function and an audio sound generation processing function, and exhibits the three-dimensional graphic processing function and the audio sound generation processing function at the time of executing any one of the engine applications $39_1$, $39_2$, . . . .

The host interface section 52 is located between the host section 30 and the control processing section 51, and performs buffering of various data and various commands transferred to and from the host section 30, and acts as an interface between various control signals. This host interface section 52 has a two-port RAM (Random Access Memory) element.

In the host interface section 52, at one port of the two-port RAM element, it is connected to the control processing section 51 by and internal data signal DT and an internal control signal CNT. Here, the internal control signal CNT includes signals such as an internal write command signal to the two-port RAM element and an internal read command signal from the two-port RAM element, which the control processing section 51 issues toward the host interface section 52. Moreover, the internal control signal CNT includes signals such as an internal interrupt signal which indicates that data has been sent from the host section 30 toward the engine section 40, which the host interface section 52 issues toward the control processing section 51.

Moreover, in the host interface section 52, at the other port of the two-port RAM element, it is connected to the host section 30 by an interface control signal ICT and an interface data signal IDT of 8-bit parallel for example. Here, the interface control signal ICT includes signals such as an interface write command signal to the two-port RAM and an interface read command signal from the two-port RAM, which the host section 30 issues toward the host interface section 52. Moreover, the interface control signal ICT includes signals such as an interface interrupt signal which indicates that data has been sent from the engine section 40 toward the host section 30, which the host interface section 52 issues toward the host section 30.

By exchanging signals as described above, responses and commands associated with adjunct data according to the requirement are transferred between the host section 30 and the engine section 40 via the host interface section 52.

In the display output selecting section 53, one of the host display image signal HID and the engine display image signal EID is selected and output as follows, as the display image signal MID, in accordance with instructions by the host output control signal HCT from the host section 30 and the engine output control signal from the control processing section 51. Here, when a priority display of a host image is specified by the host output control signal HCT, the display output selecting section 53 selects the host display image signal HID, and outputs as the display image signal MID, irrespective of the instruction by the engine output control signal ECT. On the other hand, when the priority order of the host image is not specified by the host output control signal HCT, the display output selecting section 53 selects one of the host display image signal HID and the engine display image signal EID, as the display image signal MID, according to the instruction by the engine output control signal ECT.

In other words, in the display output selecting section 53, when the priority display of the host image is not specified by the host output control signal HCT, and the display of the engine image is specified by the engine output control signal ECT, the engine display image signal EID is selected and output as the display image signal MID. Moreover, in the display output selecting section 53, when the priority display of the host image is not specified by the host output control signal HCT, and the display of the engine image is not specified by the engine output control signal ECT, the display output selecting section 53 selects the host display image signal HID, and outputs as the display image signal MID.

In the audio output selecting section 54, similarly as in the display output selecting section 53 as described above, one of the host audio signal HAD and the engine audio signal EAD is selected and output as the audio signal MAD, in accordance with an instruction by the host output control signal HCT and the engine output control signal ECT. In other words, when a priority output of a host audio is specified by the host output control signal HCT, the audio output selecting section 54 selects the host audio signal HAD, and outputs as the audio signal MAD, irrespective of the instruction by the engine output control signal ECT. Moreover, when the priority output of the host audio is not specified by the host output control signal HCT, and an engine application audio output is specified by the engine output control signal ECT, the audio output selecting section 54 selects the engine audio signal EAD, and outputs as the audio signal MAD.

Figure 6:
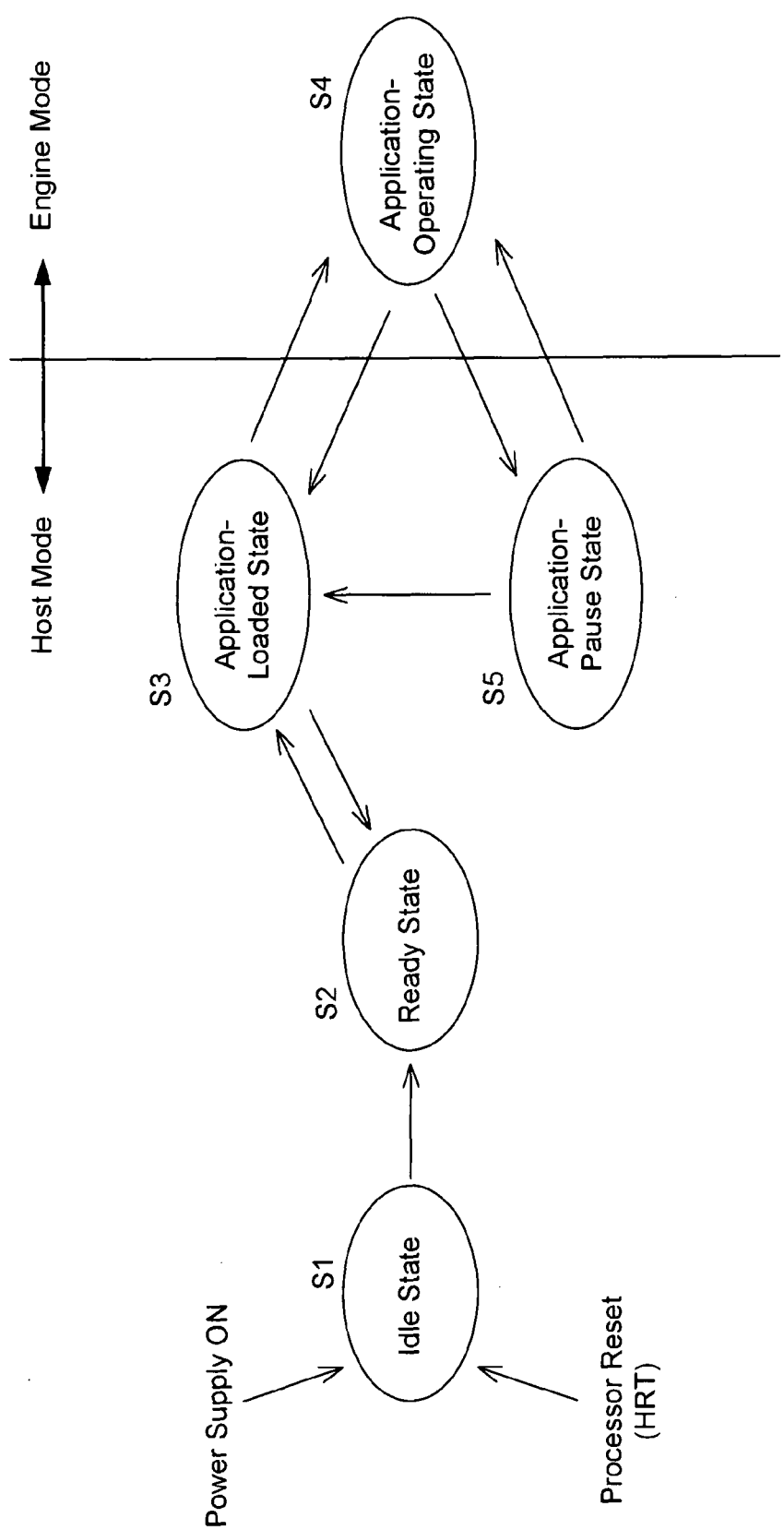
FIG. 6 is a state transition diagram for showing a transition of a state of the engine section in FIG. 2.

Next, a transition of state in the engine section 40 of the cellular phone 10 which is configured as described above will be described by referring mainly to FIG. 6. An idle state SI in FIG. 6 is a state immediately after an initialization. Moreover, a ready state S2 is a state in which, the engine integrated control computer program $39_0$ described above is executed in the control processing section 51, and some application also is stored in the application area 47 of the storage section 42. Furthermore, an application-loaded state S3 is a state in which, some applications are stored in the application area 47 of the storage section 42, and all the applications are either being executed or temporarily stopped. An application-operating state S4 is a state in which, one or more of the applications stored in the application area 47 of the storage section 42 is being executed in the control processing section 51. Moreover, an application-pause state S5 is a state in which one or more applications are stopped temporarily, and no application is being executed in the control processing section 51.

When the power supply of the cellular phone 10 is put ON, the host section 30 is initialized, and a supply of a basic clock for operation and the electric power for operation, to the engine section 40 is started. When the supply of the electric power for operation and the basic clock for operation is started, in the engine section 40, the control processing section 51 performs an initialization operation, and assumes the idle state SI as shown in FIG. 6. In the engine section 40, an arrangement is made such that the control processing section 51 performs the initialization operation even when it is detected that a reset command signal RST has been issued from the host section 30.

As the host section 30 is initialized, the host section 30 specifies a priority output of the host image by the host output control signal HCT. As a result of this, in the idle state S1, an operation mode is a host mode in which the main display section 25 and the speaker 26M are controlled by the host section 30.

In the manner described above, after the initialization of the engine section 40 is performed, when an initial loading processing to the engine section 40, from a loading of the engine integrated control computer program $39_0$ up to a start of execution is performed, the engine section 40 assumes the ready state S2. In this initial loading processing, an initial computer program loading instruction in which the engine integrated control computer program $39_0$ is let to be adjunct data, and an execution start instruction of the engine integrated control computer program without the adjunct data are issued from the host section 30 to the engine section 40.

In the ready state S2, the loading processing of the engine application $39_j$ is performed, and when the engine application $39_j$ is loaded in the application area 47 of the storage section 42, the engine section 40 assumes the application-loaded state S3. When the loading processing of the engine application $39_j$ is performed in the application-loaded state S3, the application-loaded state S3 is maintained as the state of the engine section 40. Moreover, when the loading processing of the engine application $39_j$ is performed in the application-pause state S5, the application-pause state S5 is maintained as the state of the engine section 40.

The engine application $39_j$ which is loaded in the application area 47 of the storage section 42 is unloaded from the application area 47 by an application unloading processing which includes an issuing processing by the host section 30, of an application unloading command for which, an identifier of the engine application $39_j$ is let to be the adjunct data. The unloading processing of the engine application $39_j$ is performed in the application-loaded state S3, and when there is no application whatsoever, stored in the application area 47 of the storage section 42, the state of the engine section 40 undergoes transition from the application-loaded state S3 to the ready state S2. Whereas, in a case in which the unloading processing of the engine application $39_j$ has been performed in the application-loaded state S3, and some application is stored in the application area 47 of the storage section 42, the application-loaded state S3 is maintained as the state of the engine section 40. Moreover, when the unloading processing of the engine application $39_j$ is performed in the application-pause state S5, the application-pause state S5 is maintained as the state of the engine section 40. In the application-pause state S5, it is not possible to unload an application which is paused (temporarily stopped).

The engine application $39_j$ which is loaded in the application area 47 of the storage section starts execution under the control of the engine integrated control computer program $39_0$, by an application execution start processing which includes an issuing processing by the host section 30, of an application execution start command for which, an identifier of the engine application $39_j$ is let to be the adjunct data. The execution start processing of the engine application $39_j$ is performed when the state of the engine section 40 is the application-loaded state S3, and when the execution of the engine application $39_j$ is started, the state of the engine section 40 undergoes transition from the application-loaded state S3 to the application-operating state S4. Moreover, when the execution start processing of the engine application $39_j$ is performed in the application-pause state S5, the state of the engine section 40 undergoes transition from the application-pause state S5 to the application-operating state S4. Whereas, when the execution start processing of the engine application $39_j$ is performed in the application-operating state S4 in which the other application has already been executed in the engine section 40, since the state of the engine section 40 is already the application-operating state S4, even when the execution of the engine application $39_j$ is started, no transition of state in the engine section 40 occurs.

At the time of transition to the application-operating state S4, the host section 30 makes a command to release a priority output of the host image and the host audio, to the display output selecting section 53 and the audio output selecting section 54, by the host output control signal ECT. On the other hand, the engine section 40 makes a command to select an image and an audio by the application, to the display output selecting section 53 and the audio output selecting section 54, by the engine output control signal ECT. As a result of this, in the application-operating state S4, the operation mode is not the host mode in which the host section 30 controls the main display section 25M and the speaker 26M as in the states S1 to S3 mentioned above, but the engine mode in which the engine section 40 controls the main display section 25M and the speaker 26M.

The engine application $39_j$ which is being executed is stopped by an application stop processing which includes an issuing processing by the host section, of an application stop command for which, an identifier of the engine application $39_j$ is let to be the adjunct data. By this application stop processing, the application being executed in the engine section 40 ceases to exist, and when the application which is paused does not exist, the state of the engine section 40 undergoes transition from the application-operating state S4 to the application-loaded state S3. As a result of this, the mode changes from the engine mode to the host mode. Moreover, although it is the application-operating state S4, when the other application is paused, as a result of the stop processing of the engine application $39_j$ being performed, when the application being executed in the engine section 40 ceases to exist, the state of the engine section 40 undergoes transition from the application-operating state S4 to the application-pause state S5. On the other hand, even when the execution of the application $39_j$ is stopped, when the other application is being executed in the engine section 40, a state transition in the engine section 40 does not occur.

Moreover, also the engine application $39_j$ which is being paused stopped, is stopped by an application stop processing which includes an issuing processing by the host section 30, of an application stop command for which, an identifier of the engine application $39_j$ is let to be the adjunct data. This application stop processing is performed in the application-pause state S5, and when the application which is being paused ceases to exist, the state of the engine section 40 undergoes transition from the application-pause state S5 to the application-loaded state S3. On the other hand, when there is other application which is being paused even when the engine application $39_j$ is stopped by the stop processing of the engine application $39_j$ which is being paused in the application-pause state S5, a state transition in the engine section 40 does not occur.

The engine application $39_j$ which is being executed is paused by an application-pause processing which includes an issuing processing by the host section 30, of an application-pause command for which, an identifier of the engine application $39_j$ is let to be the adjunct data. By this application-pause processing, the execution of the engine application $39_j$ is stopped temporarily, and when the application in operation ceases to exist, the state of the engine section 40 undergoes transition from the application-operating state S4 to the application-pause state S5. On the other hand, even the execution of the engine application $39_j$ is stopped temporarily by the application-pause processing of the engine application $39_j$, when the there is an application in operation, the state of the engine section 40 does not change.

In the application-pause state S5, the engine section 40 does not make a command for selecting an image and an audio by the application, to the display output selecting section 53 and the audio output selecting section 54, by the engine output control signal ECT. As a result of this, in the application-pause state S5, the host mode is assumed similarly as in cases of steps S1 to S3 mentioned above.

The engine application $39_j$ which is temporarily stopped, is restarted by an application restart processing which includes an issuing processing by the host section 30, of an application restart command for which, an identifier of the engine application $39_j$ is let to be the adjunct data. When the application restart processing is performed in the application-pause state S5, the state of the engine section 40 undergoes transition from the application-pause state S5 to the application-operating state S4. As a result of this, the mode changes from the host mode to the engine mode. On the other hand, when the execution of the engine application $39_j$ is restarted by the restart processing of the engine application $39_j$ in the application-operating state S4, the state of the engine section 40 does not change.

In such manner, the host section 30 and the engine section 40 operate in coordination, while controlling the operation of the engine section 40 by the host section 30. Moreover, in the engine section 40, the application is executed properly under the control of the engine integrated control computer program $39_0$.

Next, the coordination between the host section 30 and the engine section 40 in the cellular phone 10 which is configured as described above will be described by referring to FIG. 7 to FIG. 9, while focusing attention mainly on a notification of information data other than the engine integrated control computer program $39_0$, and the engine applications $39_1$, $39_2$, . . . from the host section 30 to the engine section 40.

Figure 7:
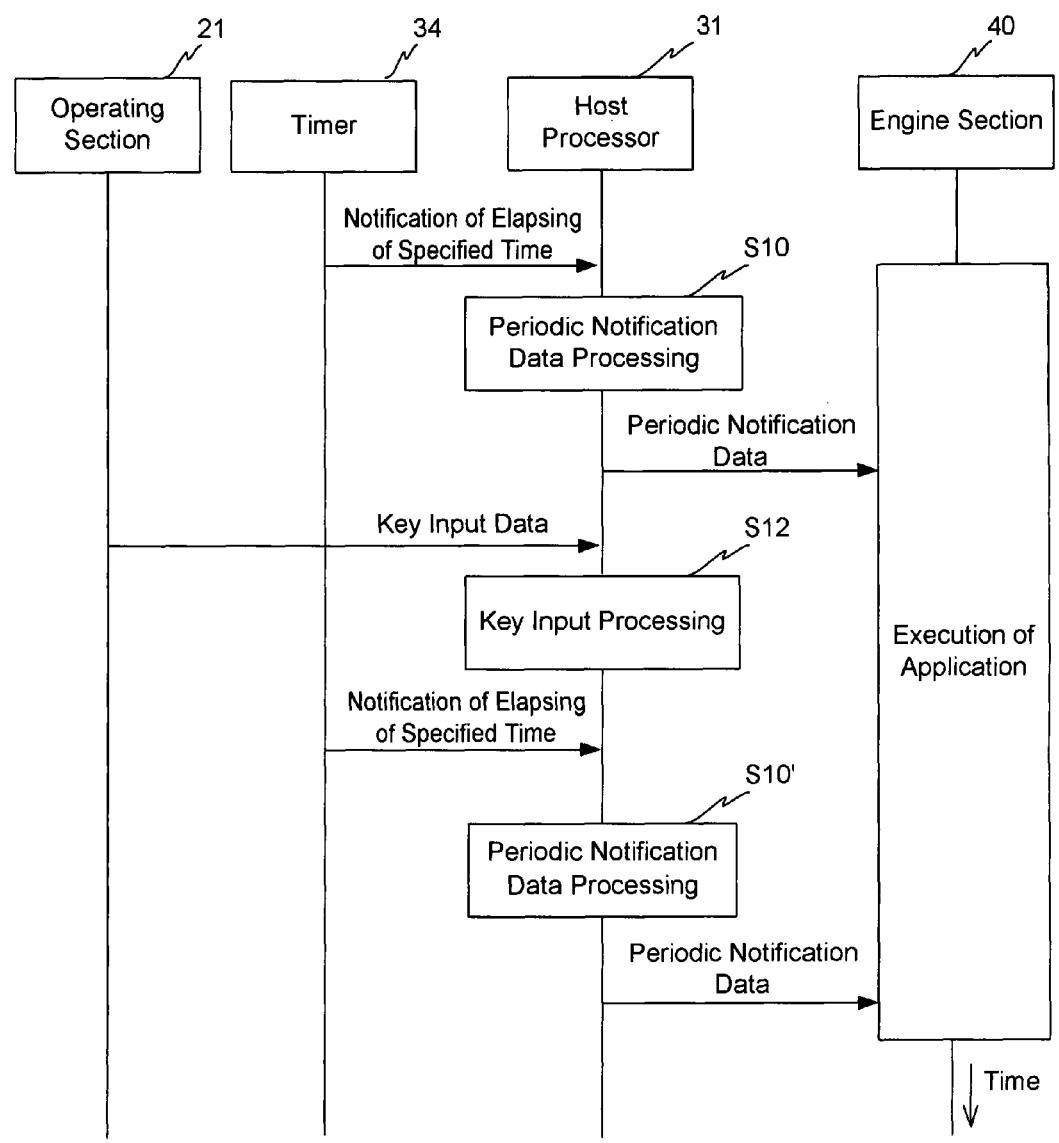
FIG. 7 is a sequence diagram for showing a coordination processing associated with a periodic data notification by the host section and the engine section.

Here, FIG. 7 is a sequence diagram in which a procedure of the coordination processing is shown.

In the engine section 40, the engine application is executed, but the following description is made considering that the application which is executed is an application which does not use the acceleration and attitude sensor 28.

Figure 8:
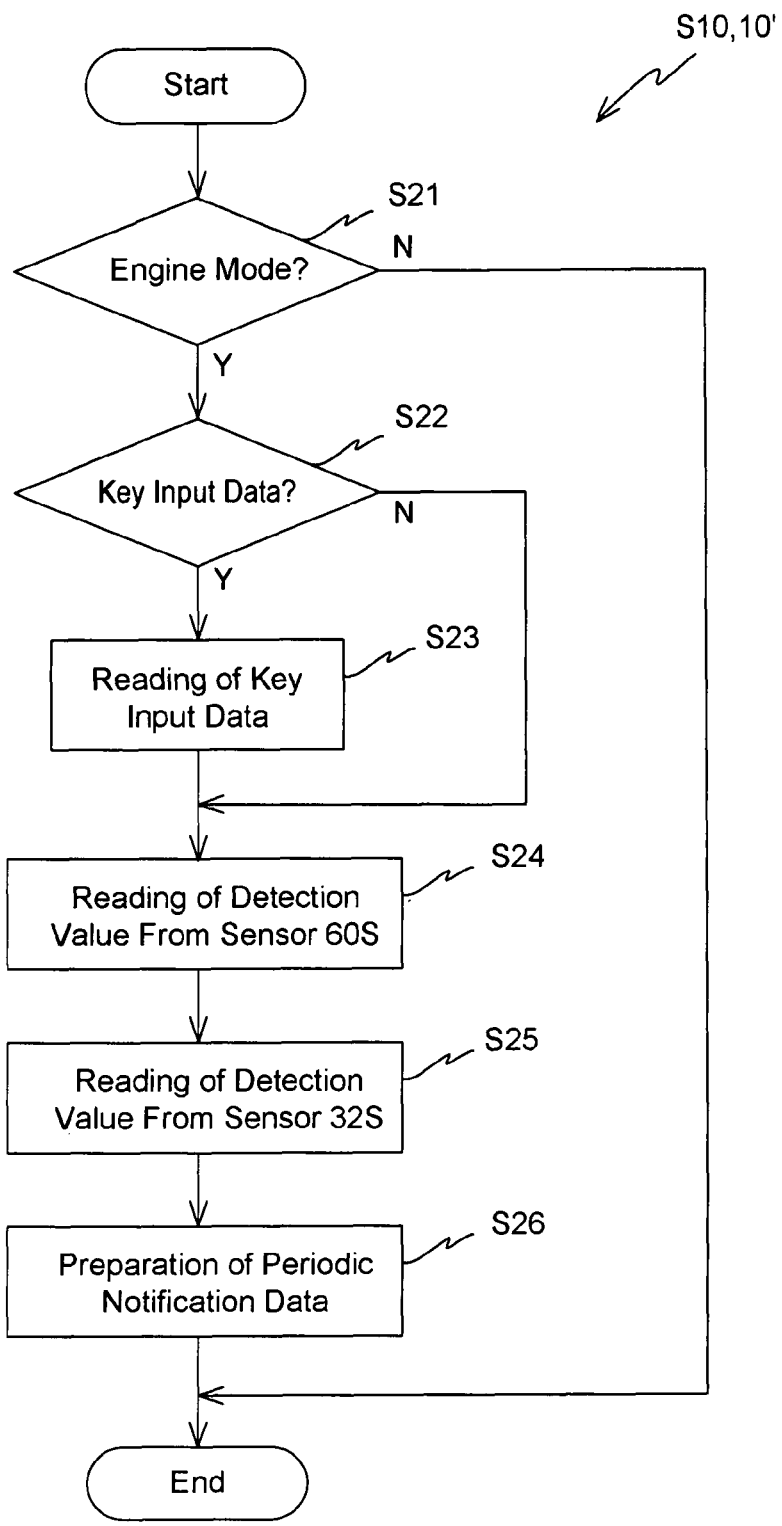
FIG. 8 is a flowchart for showing the periodic notification data processing in FIG. 7.

As shown in FIG. 7, when it is notified from the timer 34 that the specified time for a periodic data notification to engine section 40 is elapsed from the time point of the previous notification, without the keyboard input being carried out, in the host processor 31 which executes the computer program for host 38, periodic notification data processing is carried out at step S10. In this step S10, as shown in FIG. 8, first of all, at step S21, a judgment of whether or not it is an engine mode, and whether or not an attempt has not been made to stop temporarily the execution of the application with respect to the engine section 40, due to arising of a need to perform a processing associated with an occurrence of an event of a degree of priority higher than the execution processing of the application, such as an incoming call is made. When a result of this judgment is negative, processing at step S10 is terminated.

When the judgment result at step S21 is affirmative, the process shifts to step S22. At step S22, a judgment of whether or not key input data to be notified to the engine section 40, by a key input processing which will be described later, exists in a key input data buffer is made. At this stage, since a specified time for a periodic data notification to the engine section 40 has elapsed, without the keyboard input being carried out, a negative judgment is made, and the process shifts to step S24.

At step S24, the host processor 31 reads a remaining battery level value which is a detection result from the remaining battery level sensor 60S. Then, at step S25, the host processor 31 reads an electric field strength value which is a detection result from the electric field strength sensor 32S.

Next, at step S26, the host processor 31 generates periodic notification data. At this stage, data to be notified to the engine section 40 is remaining battery level value data and electric field strength value data, and the host processor 31 creates the periodic notification data which includes these data. When the period notification data is created in this manner, the processing at step S10 is terminated. In this embodiment, at the time of generating the periodic notification data, a value read from the remaining battery level sensor 60S is let to be the remaining battery level value data, and a value read from the electric field strength sensor 32S is let to be the electric field strength value data.

Coming back to FIG. 7, when the processing at step S10 is terminated, the host processor 31 notifies the periodic notification data which is created, to the engine section 40. At the time of notification, the host processor 31 sends toward the engine section 40, the periodic data notification, for which the periodic notification data is let to be the adjunct data. At this time, the host section 30, while taking effect to the interface data signal IDT with the periodic data notification for which the periodic notification data is let to be the adjunct data, as transmission data, issues an interface write signal in the interface control signal ICT, and sends sequentially toward the engine section 40.

The engine section 40 which has received this periodic data notification stores these data in the two-port RAM of the host interface section 52. Next, the host interface section 52, when has received the data from the host section 30, notifies to the engine integrated control computer program $39_0$ which is being executed in the control processing section 51, by the internal interrupt signal in the internal control signal CNT.

The engine integrated control computer program $39_0$ which has received the notification, first of all, reads from the two-port RAM of the host interface section 52, a header portion for which a command type or a response type in the data received from the host section 30 is specified, by issuing the internal read signal in the internal control signal CNT. Then, the engine integrated control computer program $39_0$ analyzes a content of the header portion which is read, and identifies that the content of the header portion is the periodic data notification.

Next, the engine integrated control computer program $39_0$ reads from the two-port RAM of the host interface section 52, the periodic notification data which is sent from the host section 30 as the adjunct data of the periodic data notification, by issuing the internal read signal in the internal control signal CNT. When the reading of the periodic notification is terminated, the engine integrated control computer program $39_0$, based on the remaining battery level value data, determines a symbol graphic for notifying the remaining battery level to the user, and based on the electric field strength value data, prepares a symbol graphic for notifying the electric field strength to the user. Then, creates an image in which these symbol graphics are superimposed on a predetermined position of an image for which a request for display has been received from the engine application which is being executed, and sends toward the main display section 25M. As a result of this, an image in the engine application execution including the symbol graphic which indicates the remaining battery level, and the symbol graphic which indicates the electric field strength, is displayed on the main display section 25M.

In the manner described above, after the periodic notification data is notified to the engine section 40, and before elapsing of the specified time, when a key on the operating section 21 is pressed by the user, the key input data is notified from the operating section 21 to the host processor 31. When the key input data is notified in this manner, at step S12, the host processor 31 performs the key input data processing.

Figure 9:
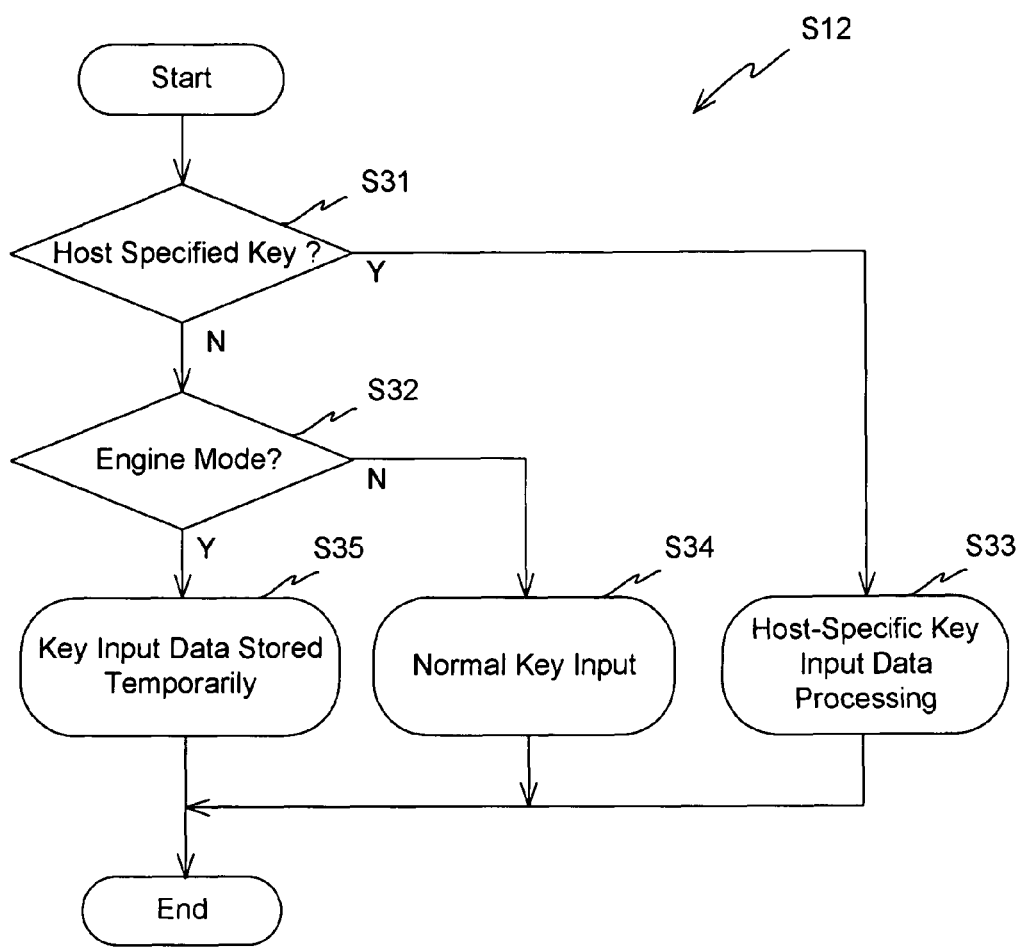
FIG. 9 is a flowchart for showing a key input data processing in FIG. 7.

In step S12, as shown in FIG. 9, first of all, at step S31, the host processor 31 makes a judgment of whether or not the key input data which is received is key input data (hereinafter 'host-specific key input data') associated with an operation by a host-specific key such as the conversation-end key mentioned above. When this judgment result is affirmative, the process shifts to step S33.

At this step S33, the host section performs a processing in accordance with the host-specific key input data which has been received. For example, when the host-specific key input data is due to a normal pressing of the conversation-end key mentioned above, and when the cellular phone 10 is performing a host-mode operation, conversation-end processing is performed when in conversation over phone, and when an operation other than conversation over phone is performed, that operation is discontinued, and a processing of shifting to the standby screen display state is performed. Moreover, when the host-specific key input data is due to normal pressing of the conversation-end key mentioned above, and when the cellular phone 10 is performing an engine mode operation, the application-pause command mentioned above is issued. Thereafter, the processing of the step S12 is terminated.

When a judgment result at step S31 is negative, the process shifts to step S32. At this step S32, the host processor 31, makes a judgment of whether or not the state of the engine section 40 is the application-operating state S4 as mentioned above, in other words, it is the engine mode, and an attempt has not been made to stop temporarily the execution of the application in the engine section 40, due to arising of a need to perform a processing associated with an occurrence of an event of a degree of priority higher than the execution processing of the application, such as an incoming call. When a result of this judgment is negative, process shifts to step S34.

At step S34, the host processor 31 performs a processing peculiar to the host section, according to the key input data (hereinafter called as 'normal key input data') other than the host-specific key input data which is received. For example, when the normal key input data which is received is key input data for specifying a telephone number of an addressee by the user, the host section identifies that the normal key input data which is received is meaningful key input data, and performs processing according to that identification result (for example a display processing of a telephone-number specifying input result on the main display section 25M), and processing of step S12 is terminated.

When a judgment result at step S32 is affirmative, the process shifts to step S35. At step S35, the host processor 31 stores in the key input data buffer, the key input data which is received. Thereafter, the processing of step S12 is terminated.

Coming back to FIG. 7, after generation of the key input data, after elapsing of a specified time for a periodic data notification to the previous engine section 40, when it is notified from the timer 34 that the specified time is elapsed, in the host processor 31 which is executing the computer program for host 38, at step S10', the periodic notification data processing is being executed. In this step S10', as shown in FIG. 8, first of all, step S21 and step S22 are executed similarly as in a case of step S10 mentioned above. At this stage, since the specified time for periodic data notification to the engine section 40 is input by the keyboard before elapsing, an affirmative judgment is made at step S22, and the process shifts to step S23.

At step S23, the host processor 31 reads the key input data from the key input data buffer. As a result of this, key input data which is to be read ceases to exist. Then, similarly as a case of step S10 mentioned above, the host processor 31, at step S24, reads the remaining battery level value which is a detection result from the remaining battery level sensor 60S, and, at step S25, reads the electric field strength value which is a detection result from the electric field strength sensor 32S.

Next, at step S26, the host processor 31 creates the periodic notification data. At this stage, since the key input data, the remaining battery level value data, and the electric field strength value data are data to be notified to the engine section 40, periodic notification data which is formed by these data is created. When the periodic notification data is created in this manner, processing at step S10' is terminated.

Coming back to FIG. 7, when the processing at step S10' is terminated, the host processor 31 notifies the periodic notification data to the engine section 40. At the time of notification, similarly as in the case of the periodic notification data created at step S10 mentioned above, periodic data notification for which, the periodic notification data is let to be the adjunct data is sent to the engine section 40, and is received by the engine section 40.

In the engine section 40 which has received this periodic data notification, similarly as in the case of the periodic notification data created at step S10 mentioned above, the engine integrated control computer program $39_0$ acquires the periodic notification data. Then, the engine integrated control computer program $39_0$ notifies the key input data which is read, to the engine application which is being executed. The engine application which has received this key input data, performs a processing according to the key input data. When a plurality of applications is being executed in the control processing section 51 at a point of time when the key input data is read, the engine integrated control computer program $39_0$ notifies the key input data which is read, to an application which is being executed in a foreground.

Moreover, the engine integrated control computer program $39_0$, in tandem with or in parallel to the notification of the key input data to the engine application which is being executed, similarly as described above, determines the symbol graphic for notifying the remaining battery level to the user based on the remaining battery level value data, and prepares the symbol graphic for notifying the electric field strength to the user based on the electric field strength value data. Then the engine integrated control computer program $39_0$ creates an image in which these symbol graphics are superimposed on a predetermined position of an image for which a request for display has been received from the engine application which is being executed, and sends toward the main display section 25M. As a result of this, an image in the engine application execution including the symbol graphic which indicates the remaining battery level, and the symbol graphic which indicates the electric field strength, is displayed on the main display section 25M.

As it has been described above, a plurality of types of data namely the key input data from the operating section 21, the detection result data of the remaining battery level sensor 60S, and the detection result data of the electric field strength sensor 32S, is notified collectively on periodic basis as the periodic notification data, from the host section 30 to the engine section 40.

As it has been described above, in this embodiment, whenever there occurs an event which occurs periodically such as an elapsing of specified time by a time measurement operation of the timer 34, the host section 30 makes a judgment of whether or not it is the engine-mode state in which the engine section 40 is executing the engine application, and it is estimated that the engine-mode state will continue. When this judgment result is affirmative, the host section 30 notifies to the engine section 40, information which the host section 30 has collected after the previous notification, and which is to be notified periodically to the engine section 40. As a result of this, at a periodic timing namely the occurrence of the event called as the elapsing of specified time, the periodic notification data which includes various types of information such as remaining battery level information, electric field strength information, and key input information according to the requirement, is notified from the host section 30 to the engine section 40.

Therefore, the engine section 40 is not required to carry out every time for a generation of a plurality of types of information, a data reception processing in the engine section 40 associated with the notification of specific information from the host section 30 to the engine section 40, during the execution of the engine application. Consequently, according to this embodiment, in a configuration including the host section 30 which performs processing associated with a communication with an outside, and the engine section 40 which executes a predetermined function under a control of the host section 30, it is possible to build the entire apparatus compactly, and to suppress an increase in a load on the engine processor 41.

In the embodiment described above, as the remaining battery level information, a detected value itself, of the remaining battery level sensor 60S is let to be notified from the host section 30 to the engine section 40. Whereas, an arrangement may be made such that, as the remaining battery level information, stage value information when the detected value of the remaining battery level sensor 60S is divided into a plurality of stages, or image information of a symbol graphic which is to be displayed, is notified from the host section 30 to the engine section 40.

Moreover, in the embodiment described above, as the electric field strength information, a detected value itself, of the electric field strength sensor 32S is let to be notified from the host section 30 to the engine section 40. Whereas, an arrangement may be made such that, as the electric field strength information, stage value information when the detected value of the electric field strength sensor 32S is divided into a plurality of stages, or image information of a symbol graphic which is to be displayed, is notified from the host section 30 to the engine section 40.

Moreover, in the embodiment described above, the remaining battery level information, the electric field strength information, and the key input data according to the requirement are let to be included in the periodic notification data. However, it is also possible to include time information in the periodic notification data. Moreover, the engine application which is being executed is an application which uses a detection result of the acceleration and attitude sensor 28, and when a request for using the acceleration and attitude sensor 28 is made by the engine section 40 to the host section 30, it is also possible to include the detection result of the acceleration and attitude sensor 28 collected by the host 30, in the periodic notification data.

Moreover, in the embodiment described above, the periodic data notification is made by the host section 30 to the engine section 40, by the occurrence of the event which occurs periodically, called as the elapsing of specified time. However, any event other than the elapsing of specified time may be let to be the event occurring periodically which triggers that notification, provided that it is an event which occurs periodically at appropriate intervals.

Figure 10:
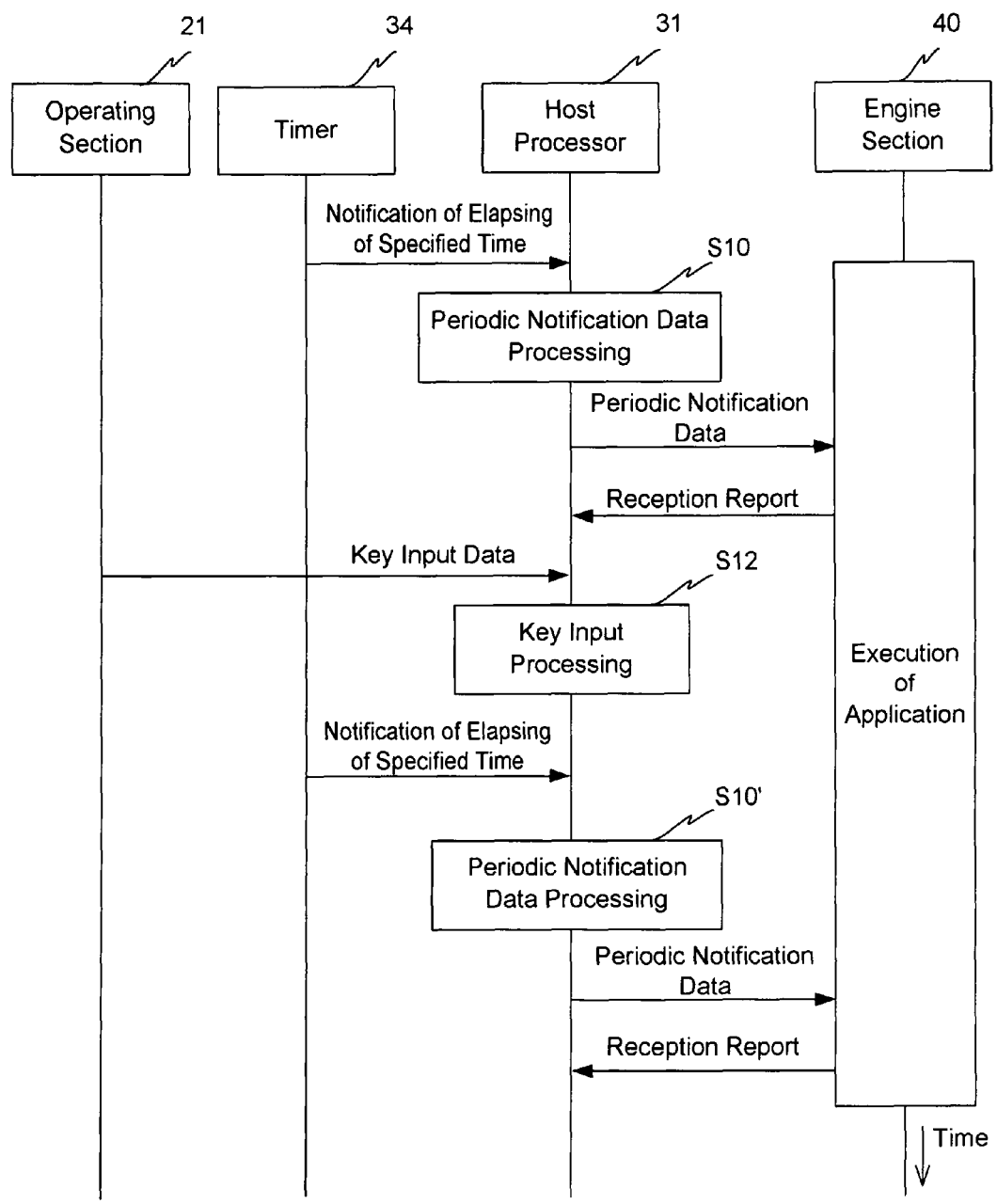
FIG. 10 is a sequence diagram for showing a modified embodiment.

Furthermore, in the embodiment described above, the engine section 40 (more particularly, the engine integrated control computer program $39_0$) is not let to return a response with respect to the periodic data notification from the host section 30. However, as shown in FIG. 10, an arrangement may be made such that the engine section 40 returns a response with respect to the periodic data notification from the host section 30.

Moreover, it is also possible to let the host processor 40 to be one processor, and it is also possible to have a two-processor configuration including a processor for communication and a processor for application integration, and to make the processor for application integration perform a control of the engine section 40 in the embodiment described above.

Furthermore, in the embodiment described above, the display output selecting section 53 and the audio output selecting section 54 are let to be built-in in the engine processor. However, it is also possible to dispose at least one of the display output selecting section 53 and the audio output selecting section 54 outside the engine processor 41.

In the embodiment described above, the host interface section 52 is let to include the two-port RAM. However, it is also possible to let to be an arbitrary configuration, provided that it is a configuration which is capable of facilitating interfacing with the host section 30.

Moreover, in the embodiment described above, in the application-loaded state S4, the application loading processing and the application unloading processing are not let to be performed. However, it is also possible to make an arrangement such that, the application loading processing and the application unloading processing can be performed in the application-operating state S4.

Furthermore, in the embodiment described above, no retry is let to be performed for the application-pause processing. However, it is also possible to make an arrangement such that the retry is performed even for the application-pause stop processing.

In the embodiment described above, the cellular phone is let to be a clamshell type. However, it is also possible to apply the present invention to cellular phones of types such as a straight type, a revolving type, and a sliding type.

Moreover, in the embodiment described above, the present invention is applied to a cellular phone. However, the present invention, as a matter of course, is also applicable to other communication terminals.

Thus, a coordination method of the present invention is applicable to an operation of coordination between a host section which includes a host processor, and performs processing associated with a communication with an outside, and an engine section which includes an engine processor, and executes a predetermined function under a control of the host section.

Moreover, the present invention is applicable to a communication terminal which includes the host section which performs processing associated with the communication with an outside, and the engine section which executes the predetermined function under the control of the host section.

What is claimed is:

1. A coordination method for operating by coordination between a host section which performs a processing associated with a communication with an outside, and an engine section which executes an application under a control of the host section, in a communication terminal, comprising steps of:
    judging an operation mode at which, whenever there occurs a predetermined event which occurs periodically when a specified time elapses, the host section makes a judgment of whether or not it is an engine-mode state in which the engine section is executing the application, and it is estimated that engine-mode state will continue;
    when it is estimated that engine-mode state will continue, judging whether key input data exists in a key input data buffer;
    when a judgment result at the step of judging the key input data is affirmative, reading the key input data, reading a first value from a first sensor, and reading a second value from a second sensor;
    generating specific information corresponding to at least one selected from among the key input data, the first value, and the second value; and
    notifying the specific information at which, when a judgment result at the step of judging the operation mode is affirmative, the host section notifies to the engine section, the specific information which is to be notified periodically to the engine section, wherein at least one selected from among the first and second values include at least one operation-environment information of the communication terminal, which the host section has collected newly after a previous notification.

2. The coordination method according to claim 1, wherein the predetermined event is an elapsing of a fixed period of time from an end of the previous step of notifying specific information.

3. The coordination method according to claim 1, wherein the operation-environment information includes state information of a power supply section of the communication terminal and time information.

4. The coordination method according to claim 1, wherein the specific information includes key input data other than key input data which is processed only by the host section, out of key input data which is input by the user, after the end of the previous step of notifying the specific information.

5. The coordination method according to claim 1, wherein the specific information includes a judgment result by a sensor used in the application, after the end of the previous step of notifying the specific information.

6. The coordination method according to claim 1, wherein the communication terminal is a mobile communication terminal.

7. The coordination method according to claim 6, wherein the operation-environment information includes electric field strength information of radio waves, which is in vicinity of the communication terminal, from a base station of a mobile communication network.

8. A communication terminal comprising:
    a host section which includes a host processor, and performs a processing associated with a communication with an outside;
    an engine section which includes an engine processor, and executes an application under a control of the host section; and
    a power supply section which supplies an operating electric power to the host section and the engine section; wherein
    whenever there occurs a predetermined event which occurs periodically when a specified time elapses, the host section makes a first judgment of whether or not it is an engine-mode state in which the engine section is executing the application, and it is estimated that the engine-mode state will continue,
    then if a judgment result of the first judgment is affirmative, the host section makes a second judgment of whether key input data exists in a key input data buffer, and the host section notifies the engine section of specific information to be notified periodically to the engine section,
    when a judgment result of the second judgment is affirmative, the host section reads the key input data, reads a first value from a first sensor, reads a second value from a second sensor, and generates the specific information corresponding to at least one selected from among the key input data, the first value, and the second value,
    wherein at least one selected from among the first and second values include at least one operation-environment information which the host section has collected after a previous notification.

9. The communication terminal according to claim 8, wherein
    the power supply section includes a power-supply state monitoring section which monitors a state of a power-supply capacity, and notifies the host section of monitoring results; and
    the operation-environment information includes information of state of the power supply capacity of the power supply section.

10. The communication terminal according to claim 8, wherein
    the host section further comprises a clock unit which is connected to the host processor; and
    the predetermined event is an elapsing of a fixed period of time, from the previous notification of the specific information.

11. The communication terminal according to claim 10, wherein
the operation-environment information includes information of present time.

12. The communication terminal according to claim 8, wherein
the host section further comprises a key input unit which is connected to the host processor; and
the specific information includes key input data other than key input data which is processed only by the host section, out of key input data which is input by the user.

13. The communication terminal according to claim 8, wherein
the host section further comprises a sensor means, which is connected to the host processor and obtains a detection result used in the application; and
the specific information includes the detection result used by the sensor, after the end of the previous notification of the specific information.

14. The communication terminal according to claim 8, wherein
the host section further comprises a wireless communication section which is connected to the host processor, and is for carrying out a wireless communication with a base station of a mobile communication network.

15. The communication terminal according to claim 14, wherein
the wireless communication section comprises an electric field strength monitoring section for monitoring an electric field strength of radio waves from the base station, and
the operation-environment, information includes electric field strength information of radio waves from the base station in the wireless communication section.

* * * * *